Dec. 19, 1961 T. P. ENGEL 3,013,298
APPARATUS FOR WORKING THERMOPLASTIC MATERIALS
Filed Nov. 27, 1957 2 Sheets-Sheet 1
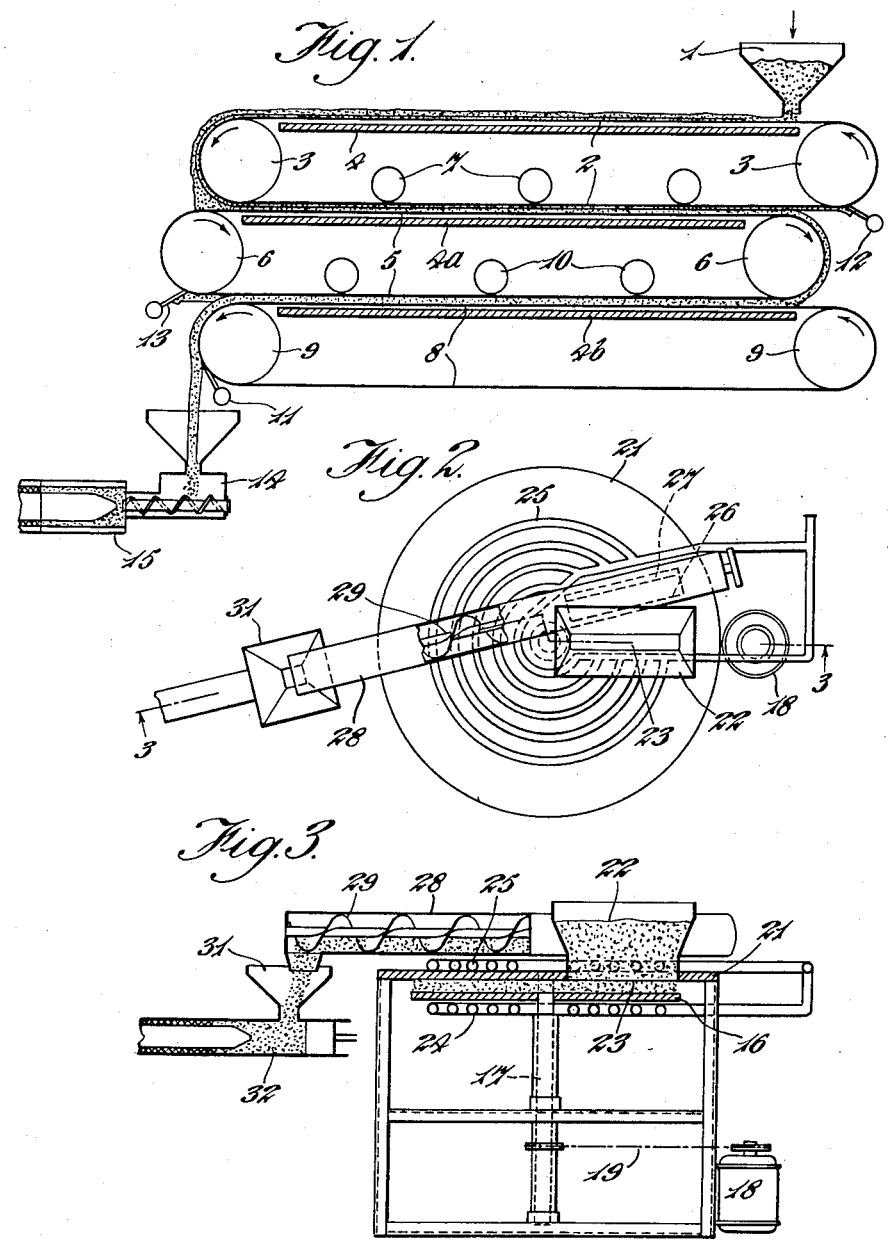
INVENTOR
THOMAS ENGEL
BY Maxwell Sparrow
ATTORNEY Dec. 19, 1961 T. P. ENGEL 3,013,298
APPARATUS FOR WORKING THERMOPLASTIC MATERIALS
Filed Nov. 27, 1957 2 Sheets-Sheet 2
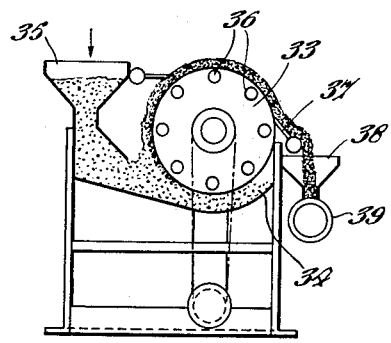
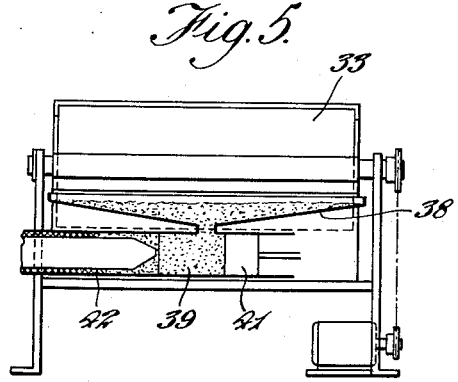
INVENTOR
THOMAS ENGEL

United States Patent Office 3,013,298
Patented Dec. 19, 1961

3,013,298
APPARATUS FOR WORKING THERMOPLASTIC MATERIALS
Thomas Paul Engel, Weikertsbloch Strasse 48, Offenbach (Main), Germany
Filed Nov. 27, 1957, Ser. No. 707,659
Claims priority, application Germany Nov. 30, 1956
2 Claims. (Cl. 18—1)

The working of thermoplastic materials by extrusion or injection moulding necessitates plasticisation of the said materials by heating. In some cases, it is desirable to reach not only the plastic state but also the viscous state. For a satisfactory performance of the working operation in the shaping tool (die or mould) the thermoplastic material must be available on the input side of the shaping tool in a thermally uniform, plastic or viscous condition. This requirement has not hitherto been completely satisfied, especially in continuous working operations or in the working of large quantities of thermoplastic material. The practice has generally been to feed thermoplastic materials directly to the shaping tool by means of a screw press, the heating of the material in the screw press being effected by conversion of mechanical work into heat, if necessary with a supply of heat. This method of heating requires mechanically stable conveyor tools and the provision of heat sources therein, whereby the design of the tools is complicated.

In the process according to the present invention the thermoplastic material is heated in a heating device to bring it to the required consistency for moulding, and is then fed into moulds or dies by a separate conveying device. The materials are thus first brought into the plastic or viscous state in the heating device, whereafter the heated material is fed either directly, or indirectly through a collecting receptacle in which it stays for a short time, to a device for conveyance to the shaping tool.

The apparatus employed for the heating need not be connected to the conveyor device, although such an arrangement is possible and convenient in some cases.

The initial comminuted, for example granular or pulverous thermoplastic material is subjected to the action of one or more heat sources. Preferably, the said material is brought to a plastic or viscous state by distributing the said materials in finely divided form in a thin, substantially uniform layer over a travelling heat-transfer means, exposing the latter to a source of heat and removing the heated materials from the heat-transfer means.

Naturally, the speed of travel of the heat transfer means must be adapted to the intensity of the heat emission and to the heat transfer from the source of heat to the heat transfer means and from this to the thermoplastic material. At the delivery end of the travelling heat transfer means, the material is removed in the desired plastic or viscous state and fed directly or indirectly by means of a feed device to the shaping tool.

The travelling heat-transfer means may comprise, for example, one or more endless belts, a turntable, or a drum, and examples of apparatus for carrying out the invention will be described which embody each of these forms of heat-transfer means.

The invention is hereinafter described with reference to the accompanying diagrammatic drawings, in which:

FIGURE 1 is a side elevation of apparatus according to the invention embodying endless belts;

FIGURE 2 is a plan view of an apparatus according to the invention embodying a turntable;

FIGURE 3 is a sectional elevation of the apparatus shown in FIGURE 2, the section being taken on the line 3—3 of FIGURE 2;

FIGURE 4 is a sectional side elevation of an apparatus according to the invention embodying a drum; and FIGURE 5 is an end elevation of the apparatus of FIGURE 4; some parts being shown in section.

Referring to FIGURE 1 of the drawings, the comminuted thermoplastic material to be heated passes from a feed hopper 1 on to an endless metal belt 2, preferably in a layer of uniform thickness. The said belt travels around guide rollers 3, at least one of which is driven, and slides over a heating plate 4. The belt 2 is thus heated from the inside. In travelling from the hopper 1, the grains of the material are heated and are already sticking lightly together when the belt reaches the point of reversal further from the hopper, and thus enter the gap between the belt 2 and a further belt 5, which in turn travels around guide rollers 6, at least one of which is driven. The upper run of the belt 5 slides over a heating plate 4a. Naturally, adjacent belt runs move in opposite directions. The heat acts on the thermoplastic material both from below and from above between the belt 2 and the belt 5, since the heating plate 4 adjacent the upper run of the belt 2 heats the space enclosed by the said belt and consequently also the lower run of the belt 2. Alternatively, heating plates or other sources of heat not shown in the drawings may be provided also on the lower run of the belt 2. In order that a good heat transfer may take place in the space between the belts 2 and 5, there are provided on the lower run of the belt 2 idling rollers 7 which prevent or limit upward bulging of the lower run of the belt 2 and at the same time exert a pressure on the thermoplastic material. The heating process may be continued in a third stage in the gap between the belt 5 and a further belt 8, the upper run of which slides over a heating plate 4b, but this third stage is not necessary. The belt 8 travels around guide rollers 9, at least one of which is driven. Idling rollers 10 are again provided on the inner side of the lower run of the belt 5. The adjacent belt runs 5 and 8 travel in the same direction, so that the thermoplastic material is conveyed in the same direction in the space between the belts 5 and 8. The completely uniformly heated plastic or viscous mass of thermoplastic material can then be discharged by means of a stripping device 11 from the point of reversal at the delivery end of the belt 8. Stripping devices 12 and 13 are also provided to remove plastic material which may adhere to the undersides of the belts 2 and 5. The belts 2 and 5 and/or the belts 5 and 8 may be arranged to run at different speeds to facilitate mixing of the material and assist even heating.

The material removed from the belt 8 by the stripping device enters a conveying device 14 by which it is fed to a mould or die 15.

Where a single band of sufficient length can be provided, the thermoplastic material may be stripped from that belt and fed directly to the conveying device 14.

Referring now to FIGURES 2 and 3 of the drawings, a metal turntable 16 is mounted on a vertical spindle 17 so as to rotate in a horizontal plane, rotation being effected by an electric motor 18 and a belt drive 19. The turntable 16 is mounted slightly below a fixed plate 21, and a hopper 22, mounted above a slot 23 in the fixed plate, which slot is substantially radial to the turntable contains comminuted thermoplastic material which is fed through the slot to form a layer on the said turntable. Heating means 24, are mounted immediately underneath the turntable 16, and additional heating means 25 may be mounted above the fixed plate 21. Adjacent to the slot 23 there is provided another substantially radial slot 26 in the fixed plate 21, a scraper 27 being provided to engage the surface of the turntable and deflect the thermoplastic material thereon upwardly through the slot 26 into a trunk 28 along which it is fed by a screw conveyor 29 into a receiving hopper 31 from which it passes into a conveying device 32 for feeding to an extrusion die or mould. As illustrated, the conveying device is a plunger acting in a cylinder, and the thermoplastic material is fed into an extrusion die for forming a pipe, but the conveying device may be a screw conveyor delivering the material to either an extrusion die or a mould.

The turntable is rotated in such a direction that the thermoplastic material fed on to it in a comminuted state from the hopper 22 is carried round through nearly 360° before being removed by the scraper 27, and, during this movement, is heated to a plastic or viscous condition. This form of apparatus enables very large quantities of thermoplastic material to be heated in an apparatus of relatively small size, the quantity of material which can be heated under given conditions (speed of turntable rotation and rate of supply of heat) varying as the square of the diameter of the turntable.

In the apparatus shown in FIGURES 4 and 5 of the drawings, a metal drum 33 is rotatably mounted in a chamber 34 at least the lower part of which is maintained full of comminuted thermoplastic material fed into a hopper 35, the drum 33 being internally heated by heating elements 36. Heat is transferred from the drum 33 to thermoplastic material in contact therewith, the said material adhering to the drum and being carried upwardly thereby in the form of a sheet which is removed by a scraper 37 so as to fall into a hopper 38 from which it passes to a cylinder 39 in which a reciprocating plunger 41 forces it into an extrusion die 42. Obviously, the material from the hopper 38 may pass into the trunk of a screw conveyor instead of into a cylinder containing a reciprocating plunger, and may be fed to a mould instead of to an extrusion die.

The apparatus according to the invention, in all of its forms, provide a very uniform heating of the thermoplastic material without the expenditure of a great amount of mechanical energy, and no costly and complicated screw presses are required. The apparatus brings the thermoplastic material to the desired working temperature without any local overheating which might damage the material by depolymerisation or decomposition. In addition, an installation according to the invention may be so dimensioned that very large quantities of heated plastic can rapidly be obtained. This is particularly interesting because the output of the known screw conveyor tools lags far behind the output of the shaping tools, and the latter can now be operated at higher rate, or it is possible to produce shaped articles involving the use of a larger amount of material, for example tubes of relatively large wall thickness and large diameter.

I claim:
1. Apparatus for working thermoplastic materials for moulding purposes comprising a rotatable turntable, means for rotating said turntable about a vertical axis, heating means located in proximity to the undersurface of said turntable, a feed hopper mounted above said turntable, means defining an elongated outlet at the bottom of said feed hopper extending substantially radially of said turntable, a trunk extending across said turntable above the upper surface thereof, conveying means in said trunk, means defining an elongated opening in the underside of said trunk, and scraper means engaging the upper surface of said turntable to deflect material therefrom into said trunk, said scraper means separating the thermoplastic material from the surface of said heating means and directing it into said conveying means.

2. Apparatus according to claim 1, wherein said turntable is mounted closely below a fixed plate and additional heating means are provided above said fixed plate.

References Cited in the file of this patent
UNITED STATES PATENTS

| | | |
|---|---|---|
| 654,470 | Mather | July 24, 1900 |
| 1,599,553 | Clairemont | Sept. 14, 1926 |
| 2,026,439 | Sanial | Dec. 31, 1935 |
| 2,235,324 | Moreland | Mar. 18, 1941 |
| 2,531,524 | Nichols et al. | Nov. 28, 1950 |
| 2,534,988 | Purcell | Dec. 19, 1950 |

FOREIGN PATENTS

| | | |
|---|---|---|
| 110,342 | Australia | Apr. 18, 1940 |
| 350,572 | France | Apr. 14, 1905 |
| 174,895 | Germany | Sept. 10, 1904 |